US005883806A

United States Patent [19]

Meador et al.

[11] Patent Number: 5,883,806

[45] Date of Patent: Mar. 16, 1999

[54] SECURE MEDICATION STORAGE AND RETRIEVAL SYSTEM

[75] Inventors: James W. Meador; Thomas L. Kraft, both of Houston, Tex.

[73] Assignee: KVM Technologies, Inc., Houston, Tex.

[21] Appl. No.: 725,078

[22] Filed: Oct. 2, 1996

Related U.S. Application Data

[63] Continuation of Ser. No. 314,325, Sep. 28, 1994, abandoned.

[51] Int. Cl.[6] .............................. G06F 17/00; G06G 7/48

[52] U.S. Cl. ................................ 364/479.14; 364/479.12; 312/291; 221/99; 221/154; 220/507; 220/524; 220/528; 220/260

[58] Field of Search .............................. 221/1, 2, 7, 271, 221/99, 69, 87, 125, 154; 312/291; 364/479.12, 479.14; 49/279; 220/507, 524, 528, 260, 503

[56] References Cited

U.S. PATENT DOCUMENTS

| | | | |
|---|---|---|---|
| 3,599,152 | 8/1971 | Williams | 340/147 |
| 3,606,959 | 9/1971 | Stonor | 221/2 |
| 3,762,601 | 10/1973 | McLaughlin | 221/2 |
| 3,917,045 | 11/1975 | Williams et al. | 194/4 |
| 3,998,356 | 12/1976 | Christensen | 221/2 |
| 4,293,845 | 10/1981 | Villa-Real | 340/309.3 |
| 4,473,884 | 9/1984 | Behl | 364/479 |
| 4,655,026 | 4/1987 | Wigoda | 53/55 |
| 4,725,997 | 2/1988 | Urquhart et al. | 368/10 |
| 4,733,362 | 3/1988 | Haraguchi | 364/479 |
| 4,847,764 | 7/1989 | Halvorson | 364/413.02 |
| 5,087,107 | 2/1992 | Fumanelli | 312/319 |

OTHER PUBLICATIONS

Darryl V. Wareham et al.; "Combination Medication Cart and Computer Terminal in Decentralized Drug Distribution", Am J Hosp Pharmacy, vol. 40, Jun. 1983, pp. 976–978.

*Primary Examiner*—William E. Terrell
*Assistant Examiner*—Khoi H. Tran
*Attorney, Agent, or Firm*—Arnold White & Durkee

[57] ABSTRACT

A container for pharmaceutical items, comprising a tray having at least one compartment adapted to retrievably contain at least one pharmaceutical item, each said compartment having associated therewith a lid movable between a closed position restricting access to the associated compartment and an open position permitting access to the associated compartment, and each lid having associated therewith a mechanism responsive to control signals from a computer to permit movement between the closed and open positions. The invention also includes a system for dispensing pharmaceutical items comprising at least one support structure supporting at least one drawer, each said drawer being adapted to receive at least one of the above described containers and being movable with respect to said support structure between an open position permitting access to a given compartment of a given container and a closed position restricting access to all containers in each said drawer; and at least one said computer operable to control access to each compartment in each container. The invention also includes a method of controllably and securably dispensing pharmaceutical items comprising, storing pharmaceutical items in locations identifiable by a computer and to which access is controlled by a computer, inputting data identifying a desired pharmaceutical item, and having said computer identify a location having the desired item and issue appropriate control signals to permit access to the desired item.

96 Claims, 12 Drawing Sheets

Fig. 3a
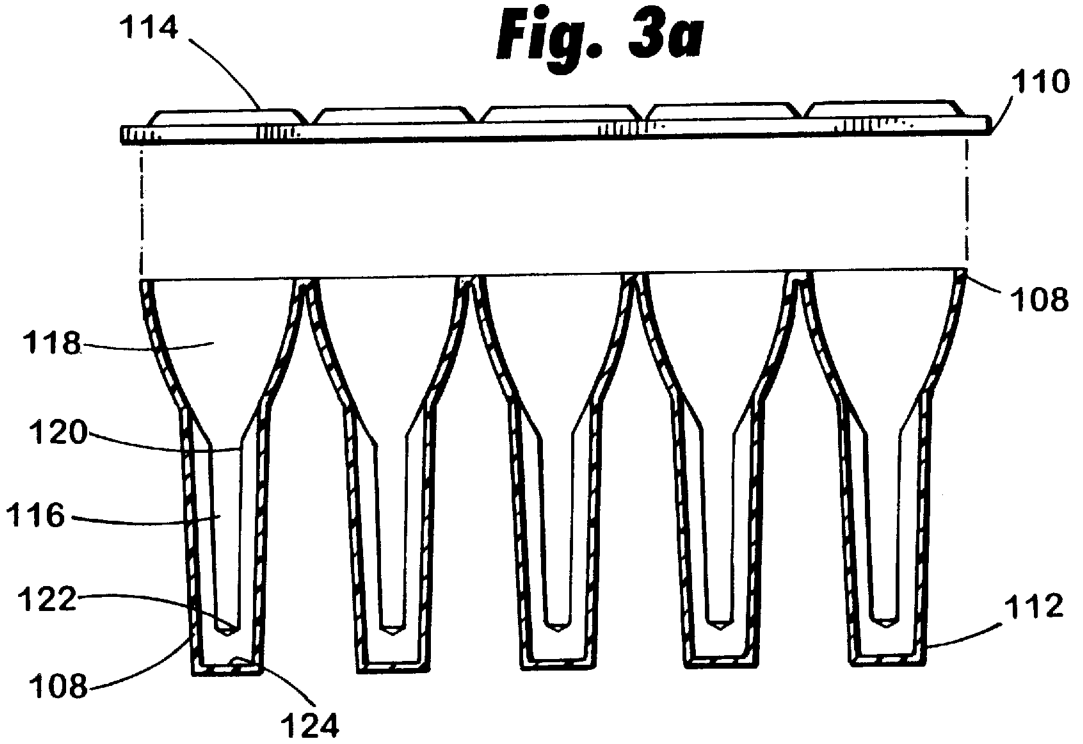
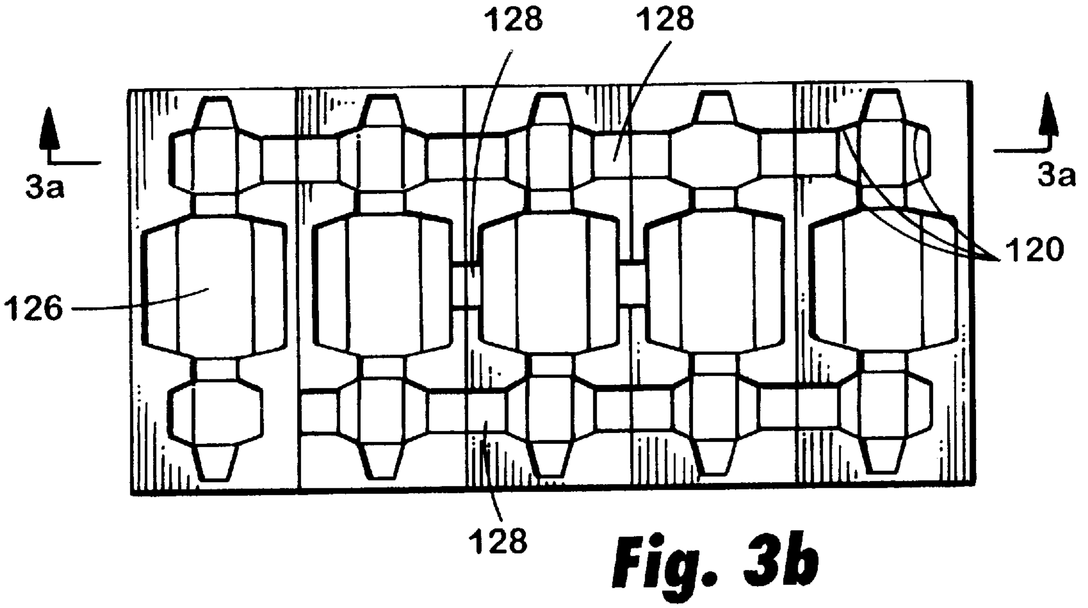
Fig. 3b

Fig. 8
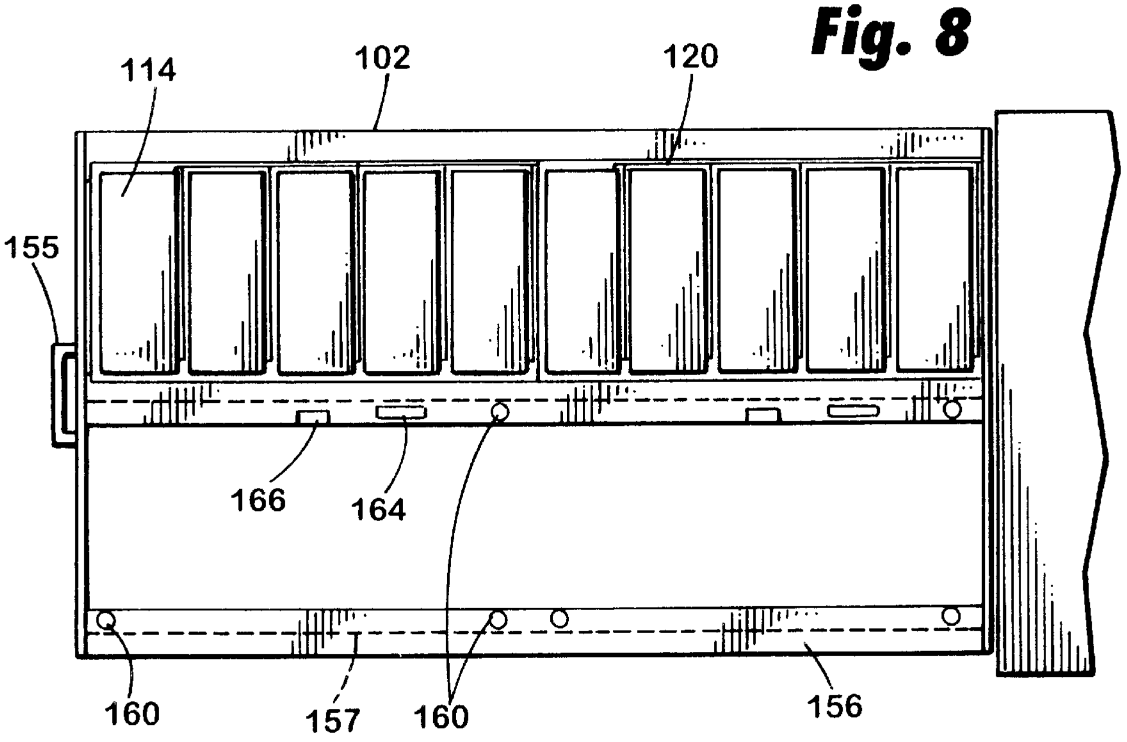
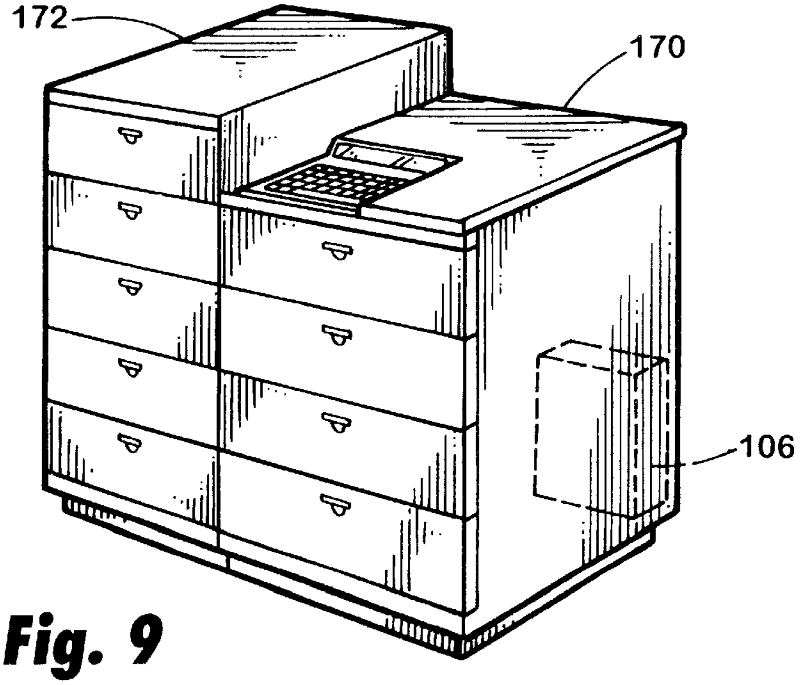
Fig. 9

SECURE MEDICATION STORAGE AND RETRIEVAL SYSTEM

This application is a continuation of application Ser. No. 08/314,325 filed Sep. 28, 1994, now abandoned.

BACKGROUND OF THE INVENTION

In recent years, a number of systems have been designed to provide pharmaceutical items at locations such as nursing stations in hospitals. By providing an inventory of medicine at such locations, these systems seek to reduce the requirement for nurses or pharmacy personnel to travel repeatedly between the nursing station and the pharmacy to acquire medicine and other pharmaceutical items. These systems also attempt to enhance the management of pharmaceutical items and the secure control of inventory. This is especially true of narcotics. Some examples of these systems include the Meditrol® Automated Dispensing System (Meditrol, Houston, Tex. 77036), the Sure-Med® (Baxter Healthcare, I. V. Systems Division, Deerfield, Ill. 60015), MEDSTATION® (Pyxis Corporation, San Diego, Calif. 92121) and Access (Lionville Systems, Inc., Exton, Pa. 19431).

Although these systems are, in many respects, adequate for their intended purpose, they are limited in other ways. Some of these systems store many identical articles together in batch in a single bin and then control bin access. When a user accesses a specific medication they are provided access to the contents of the entire bin. A disadvantage of this approach is that monitoring the specific number of articles removed from a bin by a user is difficult, if not impossible. This is due to the reliance of the system on each user to correctly and honestly report the number of articles he or she removed.

Another limitation of some of these devices is that single identical medications are loaded and stored in an array (linear or other) and then the user is then allowed access to the medicines in a fixed sequence. A limitation of arrays is that they contain identical medications. The problem with the resulting device is that to inventory a number of different medications, it is necessary to have an equal number of arrays. This follows from the sequential access limitation.

Other disadvantages of some of these devices include the requirement for the unpackaging of protective wraps on items to be dispensed, such as for prefilled syringes, before they are placed within the device. This unpackaging is a result of the inability of the device geometry to accommodate protective wraps and/or of the reliance of the device mechanism to hold some specific geometry of items to be dispensed, which the protective packaging inhibits.

Other designs provide the flexibility to access a number of medication types in a flexible format but do not offer controlled access to individual medications and pharmaceutical items.

As a result of these limitations, there is a need for a system capable of rapid and secure controlled access to pharmaceutical items including narcotics. Additionally, there is a need for a system that is not tied to a sequential, batch, or unit dose packaging format which limit flexibility and are not space efficient. There is a need for a system that provides for complete and controlled flexibility and random access to a variety of medications, including syringes, and also provide for a flexible inventory management capability. The unit should be simple to operate, so that the nursing staff may retrieve a required item. The unit should be simple and efficient to load. The unit should also be space efficient and cost effective so that the hospitals or other facilities can place them strategically and afford to use them.

BRIEF SUMMARY OF THE INVENTION

It is an object of this invention to provide a secure method of transporting pharmaceutical items, a secure method to store and provide access to such items.

It is an object of this invention to provide complete and reportable control over the inventory of pharmaceutical items, from loading to storage to access for patient dispensing.

It is an object of this invention to provide a format for the storage of pharmaceutical items in a unit that has a random access capability and does not rely on batch, sequential or unit dose formats.

It is an object of this invention to provide a system that is easy to use, space efficient and cost effective.

DESCRIPTION OF DRAWINGS

The nature, objects, and advantages of the invention will become more apparent to those skilled in the art after considering the following detailed description in connection with the accompanying drawings, in which like reference numerals designate like parts throughout, wherein:

FIG. 3*a* is an exploded view of the container, as a cross-section A—A of the container shown in FIG. 3*b*.

FIG. 3*b* is a top view of the container without the tray frame and lids;

FIG. 8 is a top view of a drawer of a drug dispensing cabinet depicting the lower part in edges in the drawer upon which the trays rest.

FIG. 9 is a schematic representation of an Independent and a Dependent cabinet.

DESCRIPTION OF A PREFERRED EMBODIMENT

Figure 1:
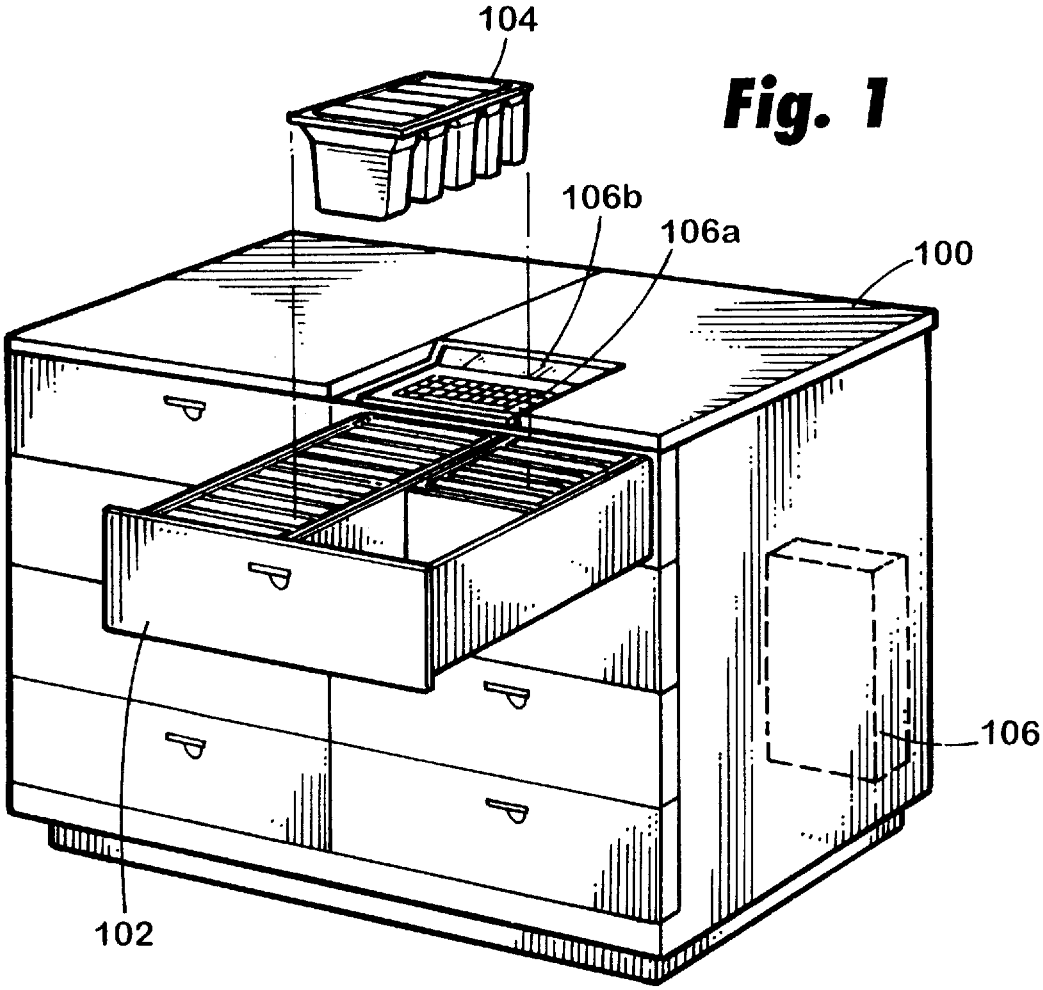
FIG. 1 is a perspective view of a drug dispensing cabinet and container.

The present invention generally involves a drug dispensing cabinet 100 having drawers 102 as shown in FIG. 1. The drawers 102 can be secured when in a closed position in the cabinet 100. The drawers 102 are adapted so that containers 104 rest within the drawers 102 and are electrically connected with a computer 106. The computer 106 includes a user input such as a keyboard 106*a* and a display 106*b*.

Figure 2A:
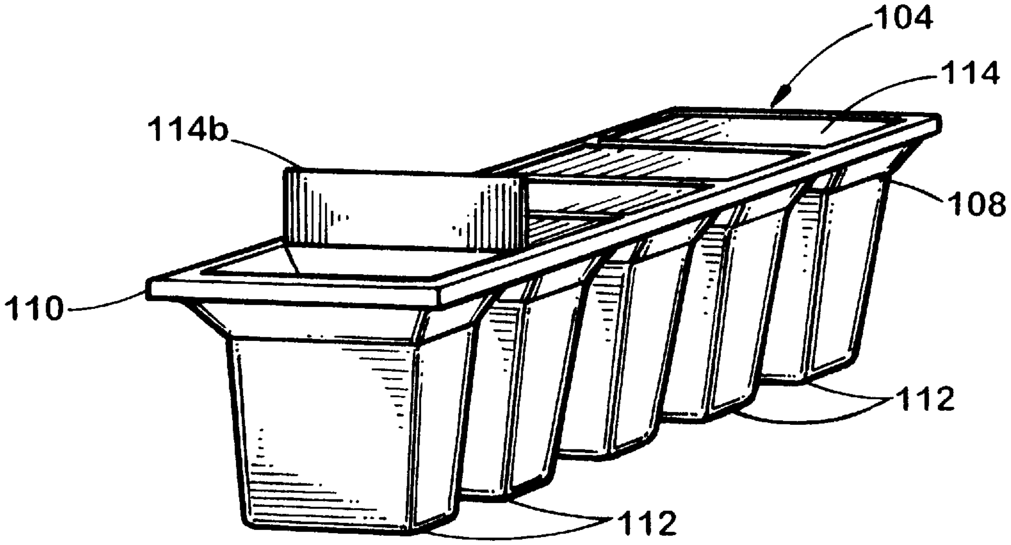
FIG. 2*a* is a perspective view of a container used in the drug dispensing cabinet with one lid open.
Figure 2B:
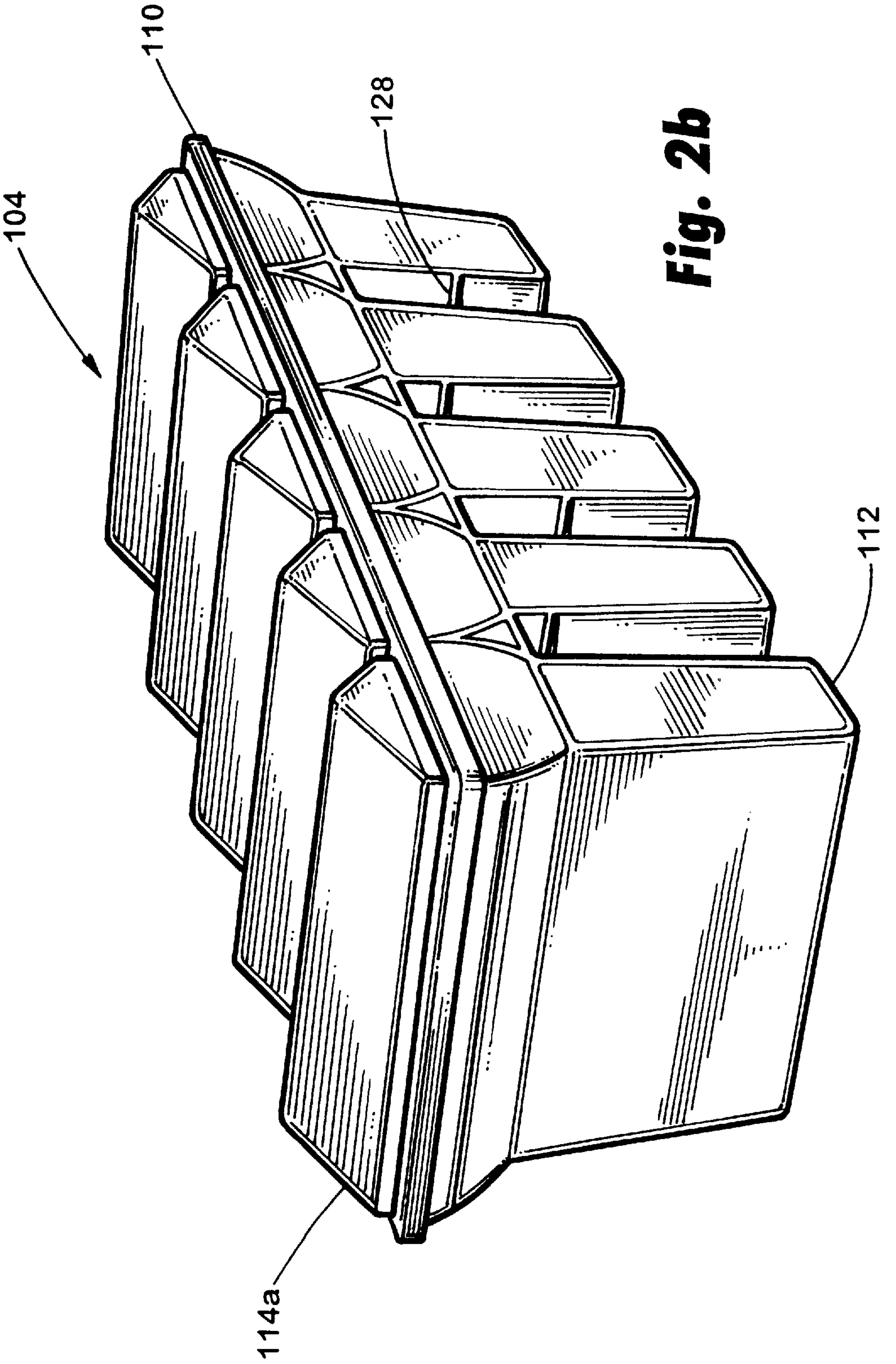
FIG. 2*b* is a perspective view of a container used in the drug dispensing cabinet where the container has tilted lids.

The containers 104, as more clearly depicted in FIG. 2*a*, include a tray 108 and a tray frame 110 as the upper portion. The tray 108 includes compartments 112, and the tray frame 110 contains individual lids 114. In the preferred embodiment, each compartment 112 contains a specific pharmaceutical item. Each compartment 112 is provided with a corresponding lid 114 which can be secured in a closed position. FIG. 2*b* depicts a container 104 with a series of tilted lids 114*a*, which can provide easier access to items by the user when the lids 114*a* are open.

In accordance with the invention, a user obtains pharmaceutical items from the drug dispensing cabinet 100 by identifying him or herself and the desired pharmaceutical item to the computer 106 via the keyboard 106*a*. The computer 106, upon identifying a container 104 compartment 112 containing the specified pharmaceutical item, sends control signals to cause a drawer 102 which contains a container 104 having the desired item to open, and causes a lid 114 corresponding to the compartment 112 having the desired item to open, such as open lid 114*b* in FIG. 2*a*. All other containers and lids in the opened drawer 102 remain secured in a closed position. Once the medication is retrieved by the user, the user closes the drawer 102 by pushing it back into the cabinet 100. This action can also close the opened lid 114*b*. In the preferred embodiment, this closing action will also return both the drawer 102 and the compartment 112 to a secured closed position. The computer 106 records the transaction and enters it into its memory in a manner to be described in more detail.

The container 104 is further depicted in FIGS. 3*a*–3*b*. FIG. 3*a* shows a cross section A—A from FIG. 3*b* of a tray 108 having five distinct compartments 112. While the described embodiment depicts only five sections 112 in tray 108, it should be understood that more or less compartments 112 can be incorporated to form a tray 108 and still be within the purview of this invention.

Each compartment 112 within the container 104 is configured so as to be suited to hold various types of medications and pharmaceutical items. To accomplish this purpose, each section is provided with a lower narrow portion 116 and an upper wider portion 118. Within narrow portion 116, there are also ribs 120 that further narrow the narrow portion 116. These ribs 120 join at a point 122 that is above the floor 124 of compartment 112.

FIG. 3*b* indicates a top view of the tray 108. The floor of center section 126 of tray 108 coincides with the floor 124 and is the deepest portion of tray 108.

Tray 108 may also contain downwardly angled troughs 128 that allow syringes to be packaged within the container 104 and be accessed through a single lid 114. The packaged syringes 130*e* are best seen in FIGS. 4*b* and 4*c*. In the preferred embodiment, as shown best in FIG. 4*c* (which depicts the container 104 of FIG. 2*b* having tilted lids with the tray frame and lids raised from the container 104 for clarity) troughs 128 are designed so that any protective wrap on the syringe 130*e* does not have to be removed before placing them in the container 104. These downwardly angled troughs 128, although communicating with adjoining compartments 112 of container 104, preclude a user from accessing any other contents that may be residing in adjoining compartments 112 of the container 104 when a specific lid 114 is opened. In a preferred embodiment, three syringes 130*e* may be packaged in container 104 with the five-compartment configuration.

Figure 4A:
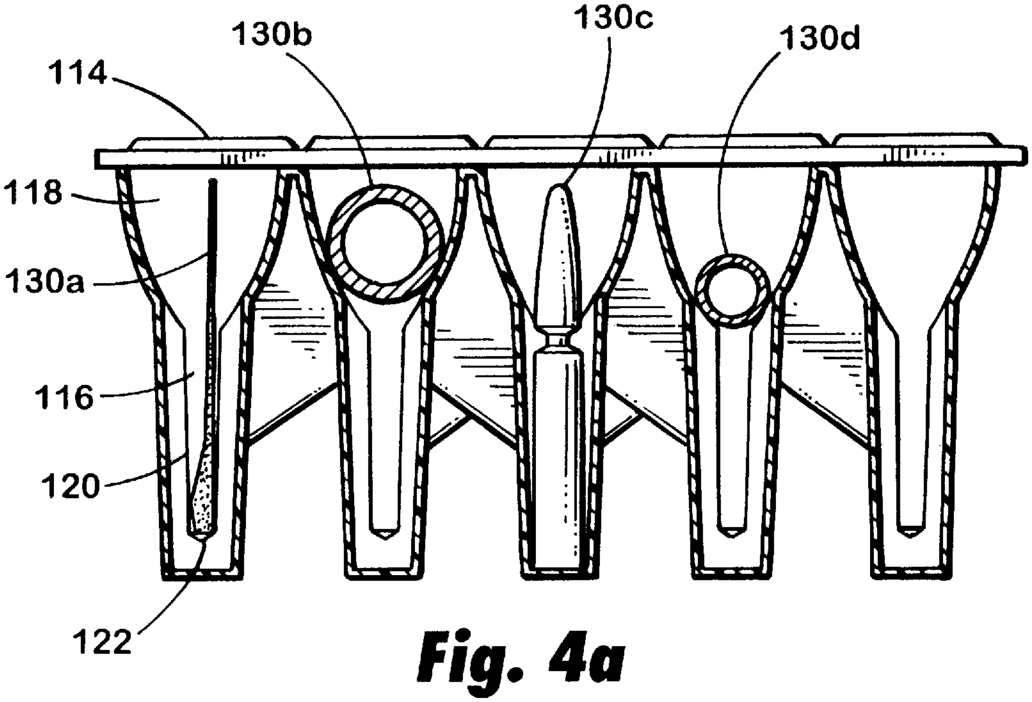
FIGS. 4*a* and 4*b* are cross sectional illustrations of a container and various medications and pharmaceutical items that can be stored in a container.
Figure 4B:
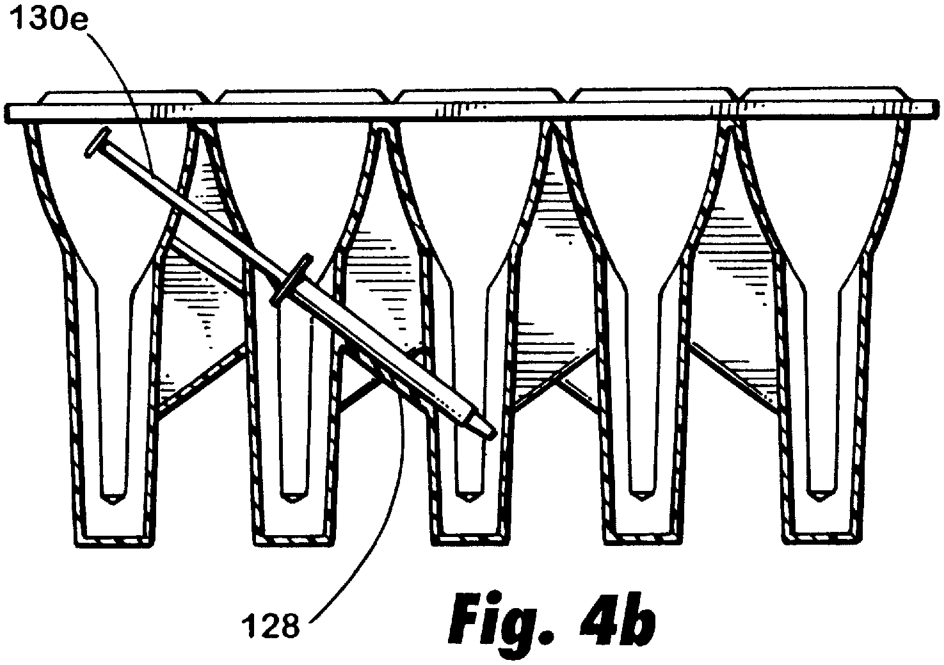
Figure 4C:
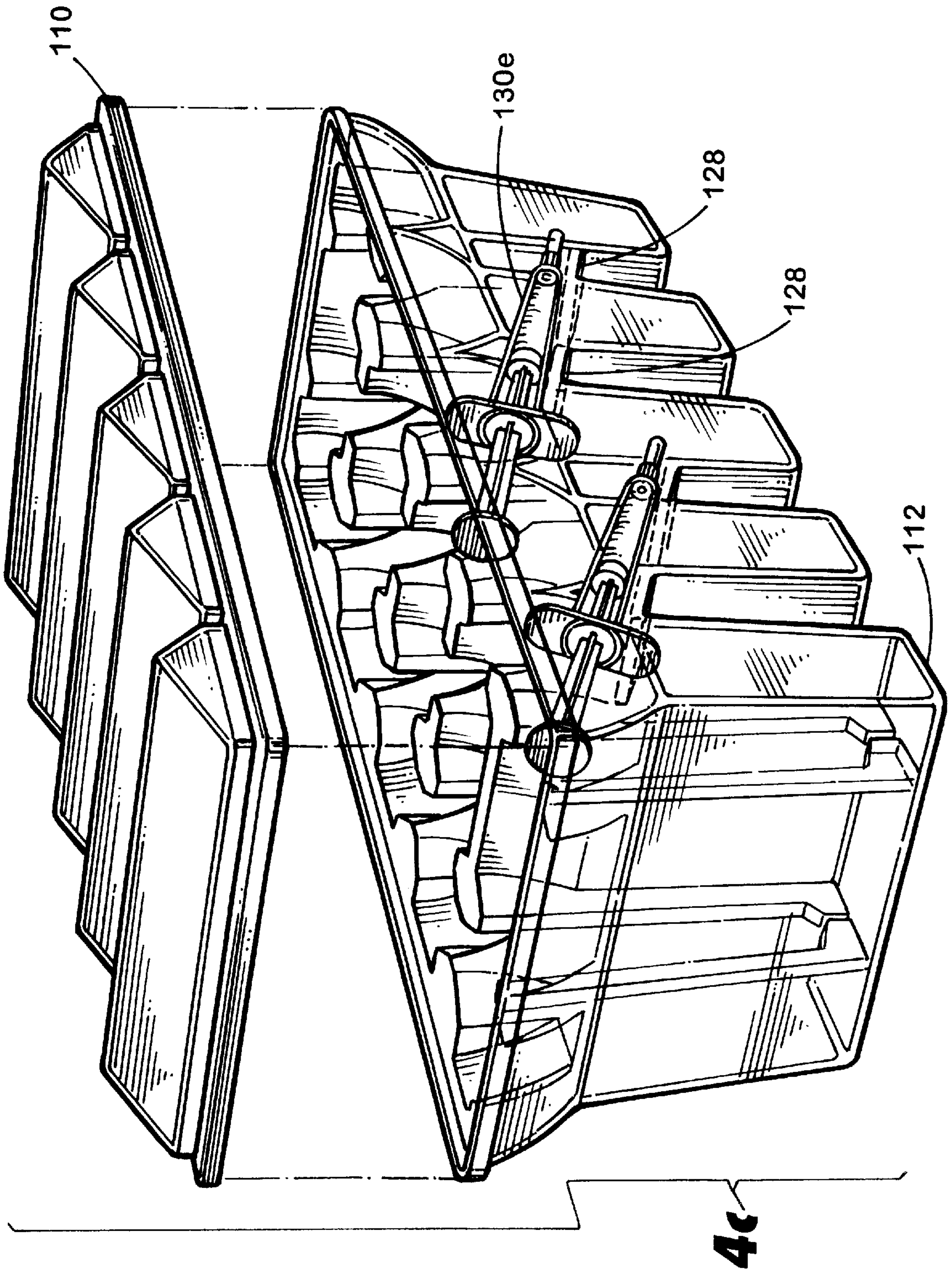
FIG. 4*c* is an exploded phantom view of a container with tilted lids showing in greater detail the angled compartments for storing elongated items such as syringes.

In FIGS. 4*a* and 4*b*, five different types of medications or pharmaceutical items that may be stored in the container 104 are depicted. These items are illustrative as to the types of geometries that may be packaged within the container 104 and they do not encompass all available geometries that may be packaged within this container 104. The types of pharmaceutical items depicted in FIG. 4*a* include a packaged envelope 130*a*, a large vial 130*b*, a tall ampule 130*c*, and a small ampule 130*d*. FIGS. 4*b* and 4*c* illustrate the packaging configuration of a prefilled syringe 130*e*.

Packaged envelope 130*a* as depicted in FIG. 4*a* represents one medication geometry and is used for containing small items such as pills and can be obtained from the automated machinery depicted and described in U.S. patent application Ser. No. 162,810, filed Dec. 6, 1993. Packaged envelope 130*a* can be considered a pharmaceutical "item" for purposes of use in the present invention, but it should be understood that more than one pharmaceutical product, such as pills, can be contained within any one envelope. The packaged envelopes 130*a* are stored in tray compartments 112 by residing within the narrow portion 116 of tray compartment 112 resting on the horizontal portion 122 of ribs 120. The top portion of the packaged envelope 130*a* extends up into the wider portion 118 of the tray compartment 112 as necessary. This geometry allows the top portion of the envelope to be within easy grasping distance of the user immediately below lid 114.

Packaging of wide, tall and narrow element geometries, such as an envelope 130*a*, is facilitated by the tray geometry of the preferred embodiment. Tall elements such as tall ampules 130*c* are intended to be stored within compartment 112 by resting in portion 116 of the compartment 112 and extending above it as necessary. In this manner, tall elements may be placed so that they remain vertical and easy to grasp when the lid 114 is opened. Packaged or unpackaged syringes 130*e* may also be stored in this manner, if not so tall as to prevent closure of lid 114. These tall yet moderate width and depth (or diameter) items can use the full depth of the tray 108 yet are inhibited from tipping over by the geometry of the tray 108 and ribs 120 as best seen in FIGS. 3*a* and 3*b*. Such positioning facilitates easy access to the pharmaceutical item by the user once lid 114 is opened.

Large vials 130*b* and smaller ampules 130*d* are intended to be stored within tray compartments 112 by resting sideways in the wider portion 118 of each compartment 112 as shown in FIG. 4*a*. These items are in this manner also oriented for ease of retrieval by the user as they are positioned for grasping immediately below lid 114.

Longer syringes 130*e*, which may encompass prefilled syringes, are designed to be packaged within container 104 by resting in a diagonal position with respect to the top of the tray across a plurality of tray compartments 112. FIG. 4*b* indicates a syringe that is downwardly oriented across three such compartments. Each syringe 130*e* rests in a trough 128 that allows mechanical communication between tray compartments 112 in such a manner to permit storage of a syringe 130*e* diagonally across tray compartments 112, but not in such a manner to allow access to other items that may be resident in the adjacent tray compartments 112. Removal of a syringe 130*e* by a user is identical to the above procedures. Once the appropriate lid 114 is opened for access, the user grasps the portion of the syringe 130*e* just below the lid 114 and removes it diagonally upward and out of the container 104. The user, due to the relatively small size of the diagonal troughs 128, cannot access other items that may be resident in the adjacent tray compartment 112. Conversely, a user who is allowed to access, say, a tall ampule 130*c* resident in portion 126 of tray compartment 112, which compartment also allows a portion of the syringe 130*e* to transverse this tray compartment 112, cannot remove the syringe 130*e* because of the diagonal nature of the trough 128 and because lid 114 is not wide enough to allow manipulation of the orientation of the syringe 130*e* to allow removal through any other lid opening other than the lid 114 dedicated for that syringe 130*e*.

Figure 5A:
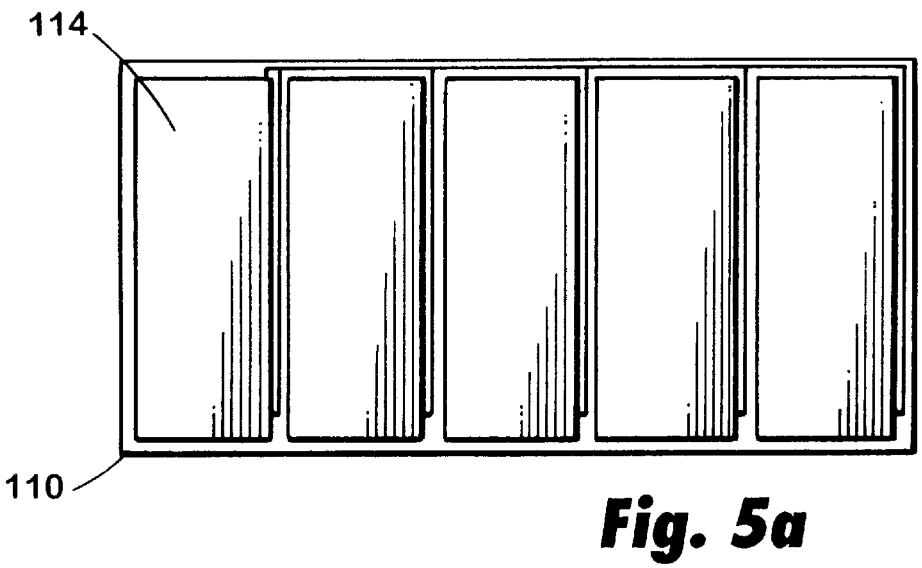
FIG. 5*a* is a top view of the container, including frame and lids.

Tray 108 is covered by a tray frame 110 and individual lids 114 to form the container 104. FIG. 5*a* shows a top view of tray frame 110 with lids 114 closed. FIG. 5*b* depicts a side view of the tray frame 110 showing the left-most lid 114*b* in a raised position. As noted earlier, in the preferred embodiment, it is desired that the computer 106 control whether the lids 114 are secured in a closed position or are unsecured. Note that depending on the particular mechanism used, it is possible for the lids 114 to be spring-biased so that when unsecured in a closed position they are always open, or instead if not spring-biased to be merely capable of being opened when unsecured. The former embodiment is preferred.

A great variety of electromechanical mechanisms responsive to electric control signals from a computer 106 can be used to controllably secure the lids 114 and, if desired, provide for their opening and closing in response to control signals. Preferable mechanisms will serve to prevent access without machine assistance to the compartments 112 when in a closed position. Such assistance might include a computer 106 and appropriate control signals from a computer 106. In this manner, such mechanisms will help the containers 104 be tamper-proof or, at least tamper-evident.

In a preferred embodiment, as depicted in FIG. 5*b*, a lid latch 132 is used to retain the lid in a secured closed position. Lid latch 132 is held in a closed position by the spring force of the lid latch 132 that brings it under and into contact with the ledge 134 in the lid frame 110. To provide for computer control of the lid 114, a mechanism generally depicted as latch release 136 is provided. Latch release 136 may comprise a great variety of electromechanical mechanisms that will respond to control signals from computer 106 to force lid latch 132 away from contact with ledge 134 sufficiently to permit lid 114 to be moved into an open position. In a preferred embodiment, lid 114 is spring-biased into an open position by means of torsion spring 138 (depicted in FIG. 6*a*), so that when the lid latch 132 is moved away from ledge 134, the force of the torsion spring 138 will cause the lid 114 to swing open about hinge pins 140.

While any number of mechanisms that will displace the lid latch 132 in response to an electrical signal can be used as the latch release mechanism, typically they will include a motive element that provides a motive force in response to an electrical signal, and a contact element moved by the motive force to contact the latch and displace it sufficiently to release the lid to an open position. Motive elements serving as motive forces can include a solenoid or a memory metal. Memory metal is a metallic substance composed of different metals that, when heated, changes states and bends predictably. Heating can be undertaken in a variety of ways, including electrical heating achieved by allowing sufficient electrical current to flow through the memory metal. Contact elements can include a plunger, or a wire positioned so that when the motive element acts on the wire, it deforms the wire forcing the wire against the latch to displace it. These two mechanisms are generally depicted as element 136 in FIGS. 5*b* and 6*a*, and more specifically illustrated in FIGS. 6*a*, 6*b*, and 6*c*.

Figure 6A:
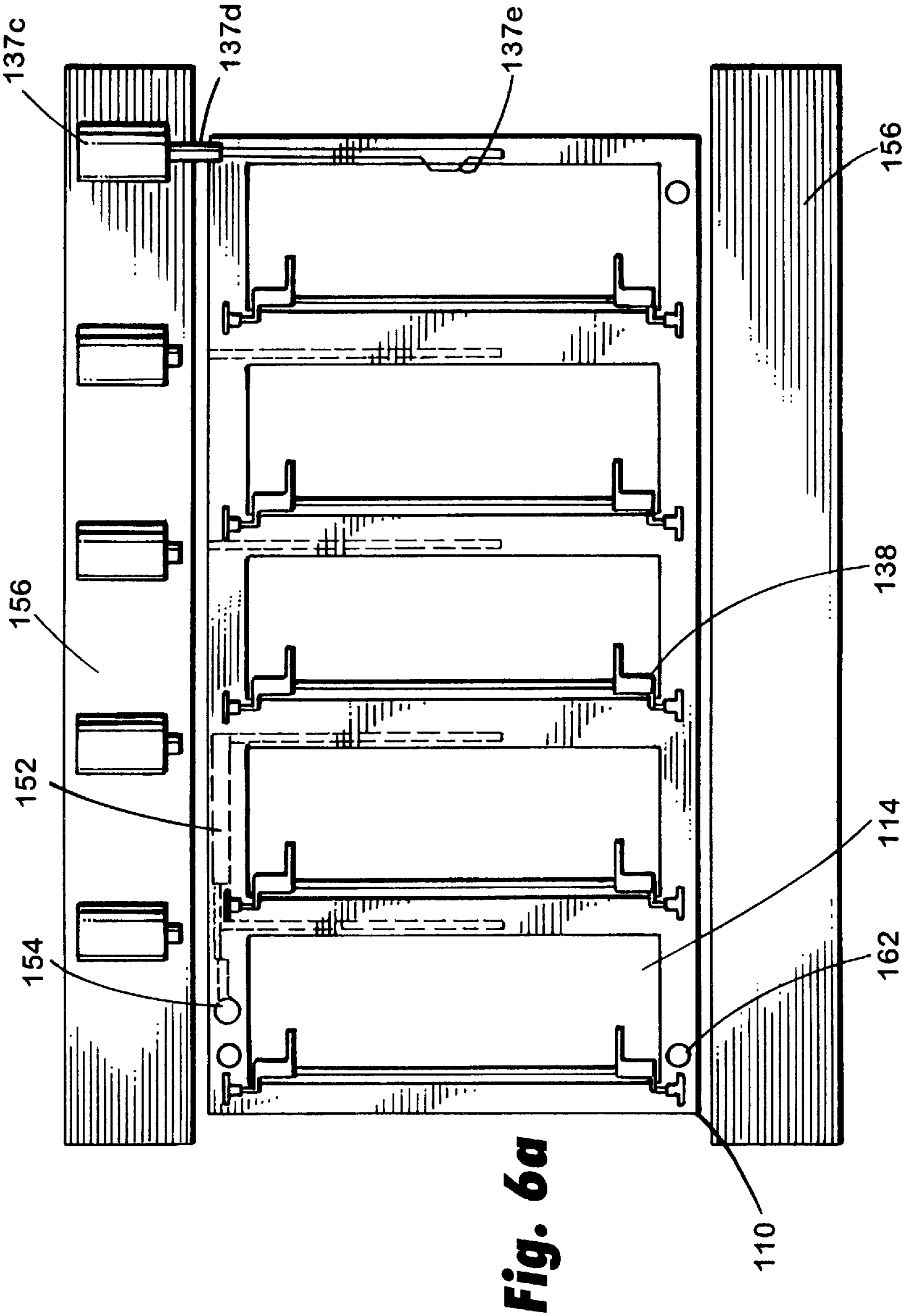
FIG. 6*a* is a bottom view of the tray frame and lids for a container mounted in a drawer.
Figure 6B:
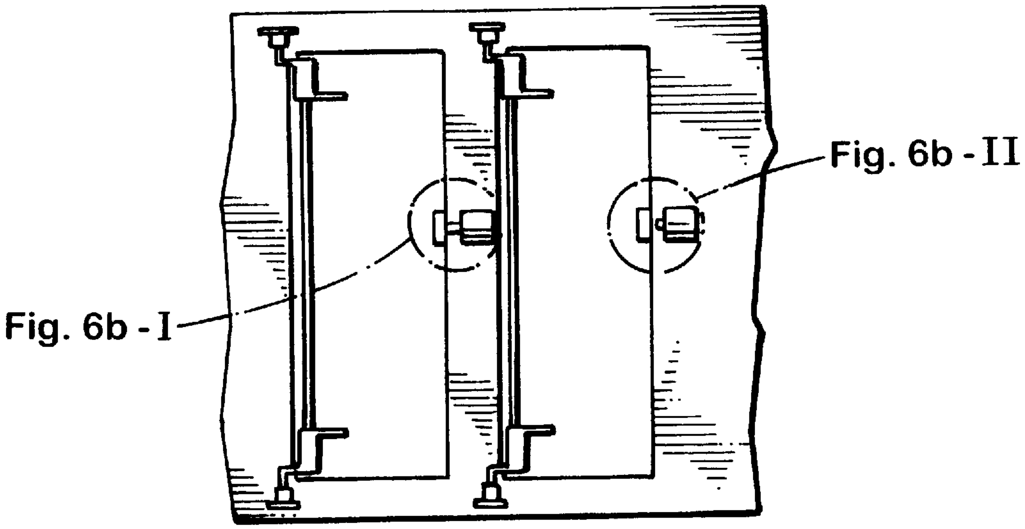
FIG. 6*b* is a bottom view of part of the tray frame and lids showing a latch release mechanism.
Figure 6B:
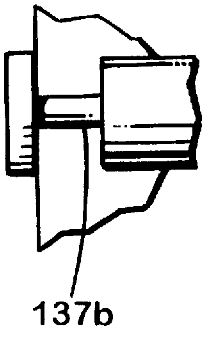
Figure 6B:
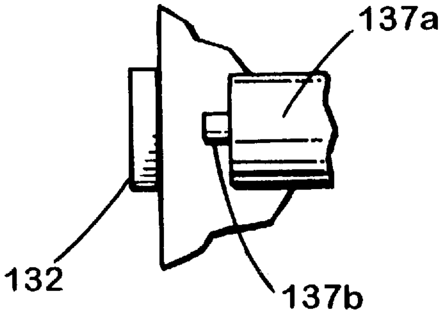

As depicted in FIG. 6*b*, the latch release is an electromechanical mechanism in the form of a solenoid 137*a* and plunger 137*b*. The solenoid 137*a* is positioned so when energized with suitable electrical power, it displaces the plunger 137*b*, which in turn contacts and pushes lid latch 132 free from ledge 134, causing lid 114 to then open via torsion springs 138.

FIG. 6*a* depicts an alternative latch release arrangement employing a solenoid 137*c*, plunger 137*d* and wire 137*e*. The solenoid 137*c* and plunger 137*d* are mounted within the drawer ledge 156 (depicted also in FIG. 8) in alignment and connection with wire 137*e* so that when solenoid 137*c* is activated in response to control signals from computer 106, it causes plunger 137*d* to move and force wire 137*e* to bend into lid latch 132 to free it from ledge 134 permitting lid 114 to open as heretofore described.

Figure 6C:
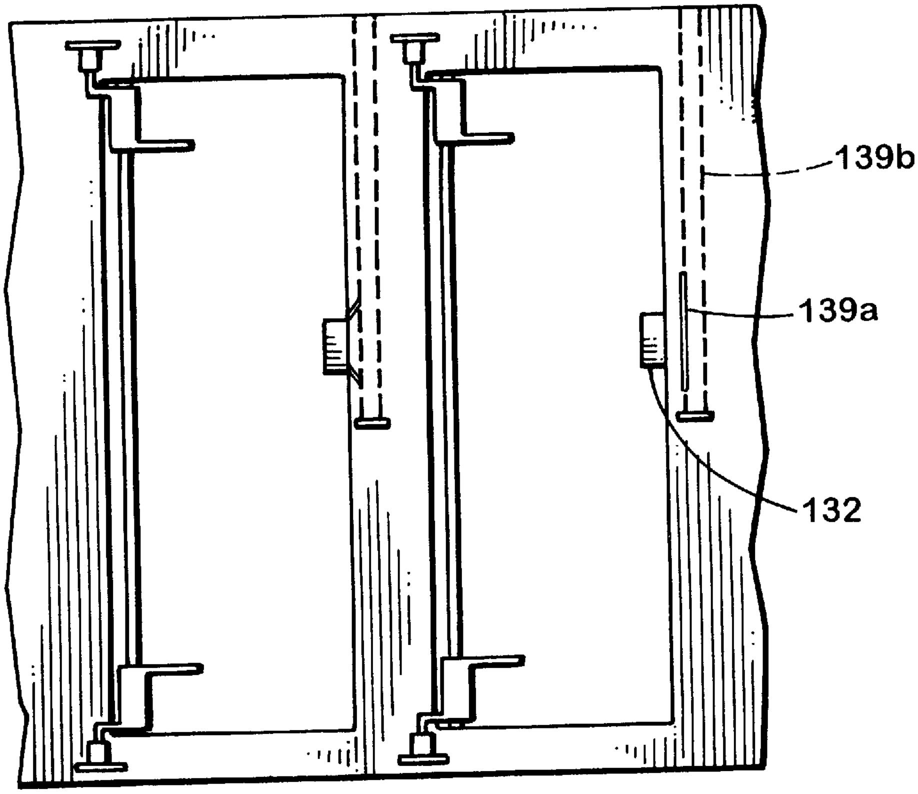
FIG. 6*c* is a bottom view of part of the tray frame and lids showing a latch release mechanism.

FIG. 6*c* depicts a preferred embodiment employing memory metal 139*a* as the motive element and the contact element. The memory metal is in electronic communication with computer 106 via wire 139*b*. The memory metal responds to a control signal as previously described by expanding to move lid latch 132 in a manner permitting lid 114 to open. It should also be understood that a memory metal element may be used as the motive and/or contact elements in any of the described arrangements using a solenoid and plunger arrangement.

Figure 6D:
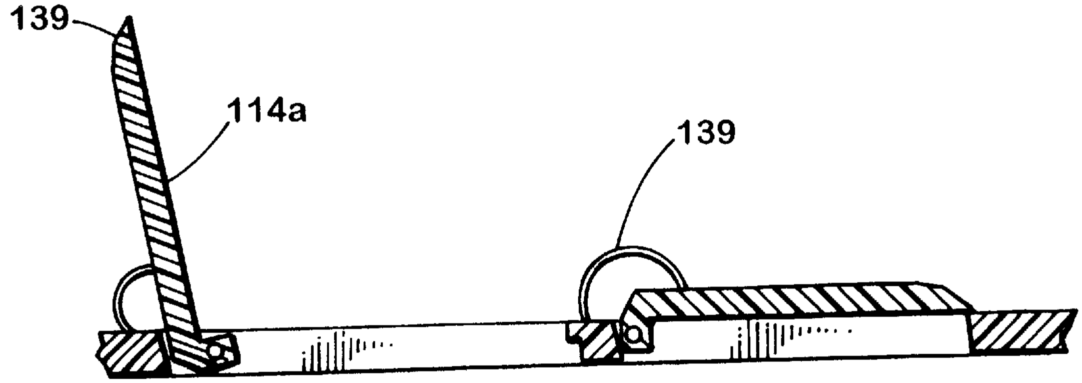
FIG. 6*d* is a side view of part of the tray frame and lids showing a latch release mechanism.

FIG. 6*d* depicts a means of controllably securing the lid 114 without use of a lid latch. Instead, the controllable mechanism in the embodiment of FIG. 6*d* utilizes a memory metal hinge 139 as a hinging and latching system. The memory metal hinge 139 is in electric communication with computer 106 and responds to control signals to contract, thereby moving lid 114 into an open position. When deenergized, the memory metal hinge 139 returns the lid 114 to its original closed position.

FIG. 6*a* also indicates an electrical connection area 152 that permits electrical connection of the container 104 to the drawers 102 of the drug dispensing cabinet 100. Container memories 154 are employed as data memory devices to store the types, lot numbers and expiration dates of the medications located in container 104, as well as serve as an identifier for the particular container 104. Container memories 154 in a preferred embodiment can be formed integral with the container 104 and can comprise small semiconductor memories referred to as "data dots."

Figure 7A:
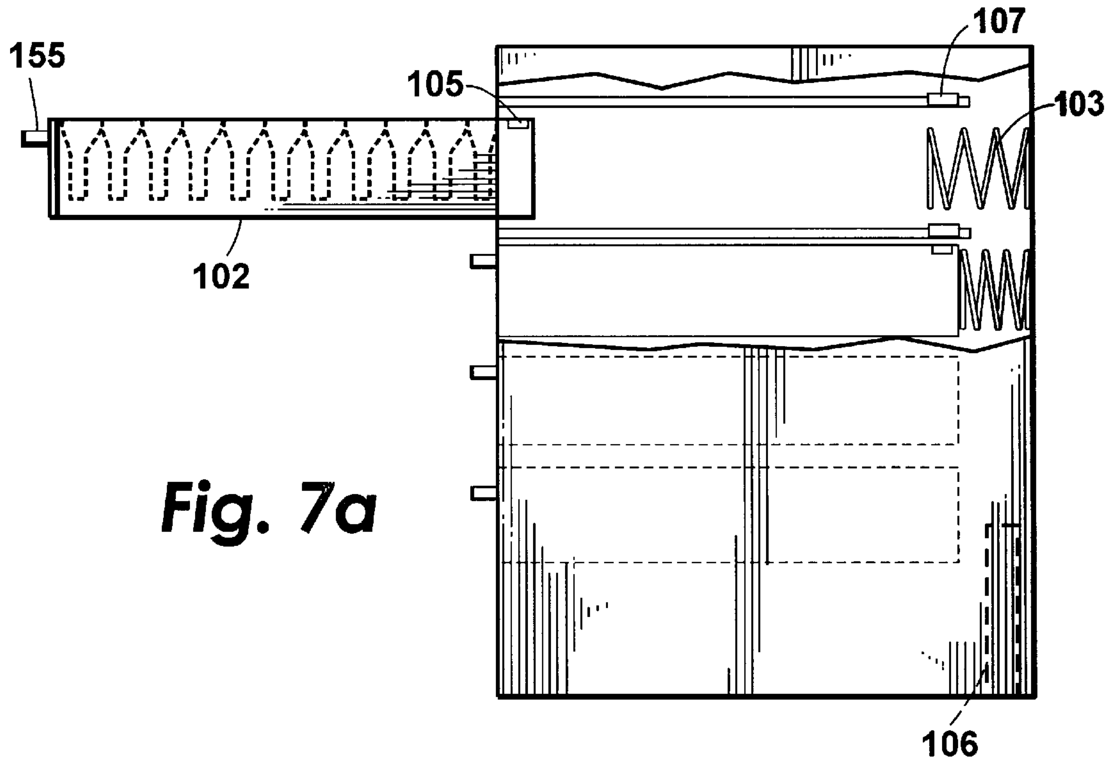
FIG. 7*a* is a side view of a drug dispensing cabinet depicting trays loaded in drawers therein.
Figure 7B:
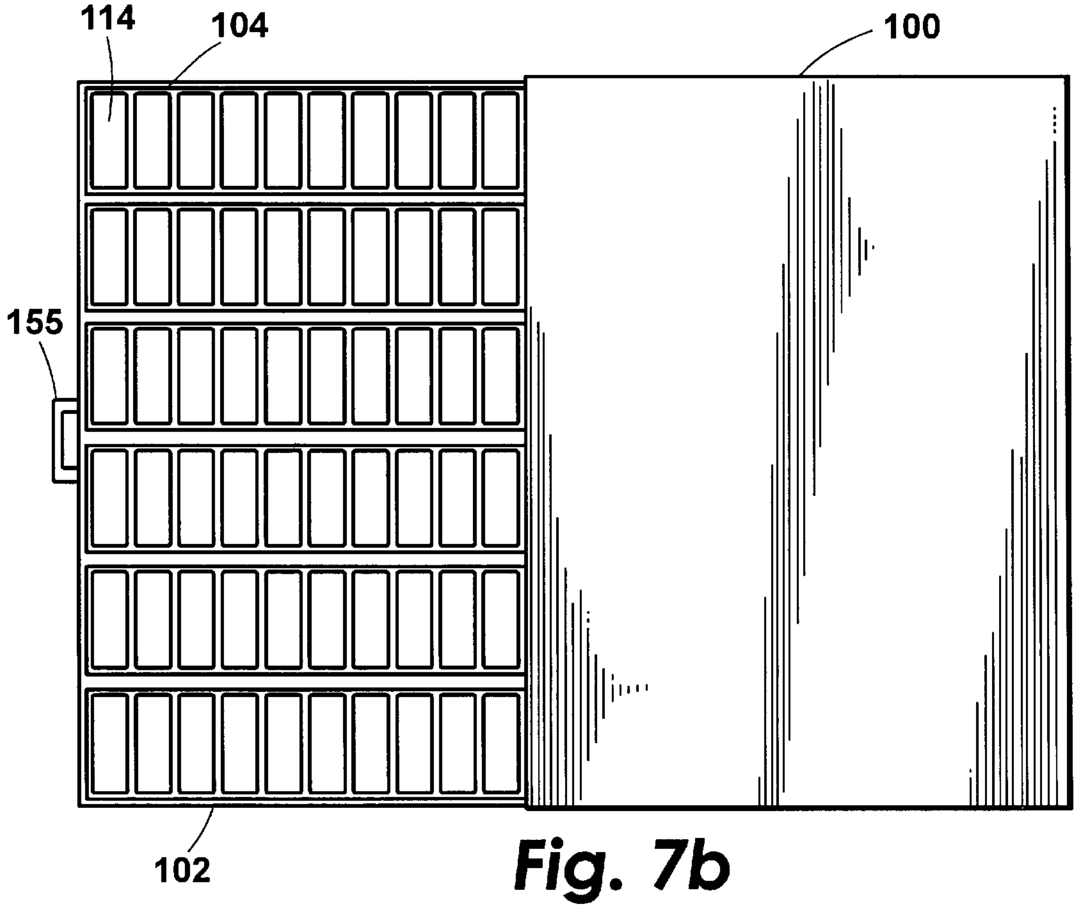
FIG. 7*b* is a top view of a drug dispensing cabinet depicting trays loaded in drawers therein.

It is intended that the containers 104 storing the various medications or pharmaceutical items previously described be stored within drug dispensing cabinet 100 as depicted in FIGS. 7*a* and 7*b*. Each drawer 102 is configured to store one or more containers 104. Each drawer 102 can be provided with a handle 155. The dispensing system may include a drawer mechanism associated with each drawer suitable for releasably securing each drawer in a closed position. A generic representation of a spring loaded drawer with a latch mechanism is shown in FIG. 7*a*. As shown in FIG. 7*a*, the drawer mechanism comprises a latch 105 which retains the drawer 102 in a closed position and is releasable to permit the drawer to move to an open position. Each drawer 102 may include a spring 103 so that the drawer is spring-biased to move the drawer to an open position. The drawer mechanism may further include an electromechanical member 107 which moves in response to a control signal from at least one computer to contact and move the latch 105 to a position which releases the drawer to move to an open position. The electromechanical member may comprise, for example, a solenoid-driven plunger or a portion of a memory metal which moves in response to control signals from a computer to contact and move the latch to a position which releases the drawer. The dispensing system may comprise an electromechanical means, such as an electromagnet or a solenoid, for retaining each drawer in a closed position.

An advantage of a preferred embodiment of the invention is that container 104 can be totally secure. Access to the pharmaceutical items other than that by the loading apparatus in the pharmacy or by a computer-controlled cabinet 100 is intended to be difficult at best and at least tamper evident. Further, the container memory 154 can be configured to carry time and date information so the system can be polled as to when it was loaded in the pharmacy and what time it was finally loaded into the drug dispensing cabinet. Lost or missing containers 104 can be known using this procedure as the container memory 154 can be initially programmed with a unique identification number.

FIG. 8 depicts a typical drawer 102 suitable for storing four containers of five sections each. The drawer 102 in FIG. 8 is depicted having two containers 104 on one side of the drawer 102 and being empty on the other side of the drawer 102. In the empty portion of the drawer 102, ledge 156 can be seen. The containers 104 are placed into the drawer 102 by permitting the trays 108 to hang below the drawer ledge 156 and having the bottom side of the perimeter of the tray frame 110 rest on the upper edges of drawer ledge 156. Dotted outline 158 indicates the peripheral outline of containers 104 as they would be installed.

Figure 5C:
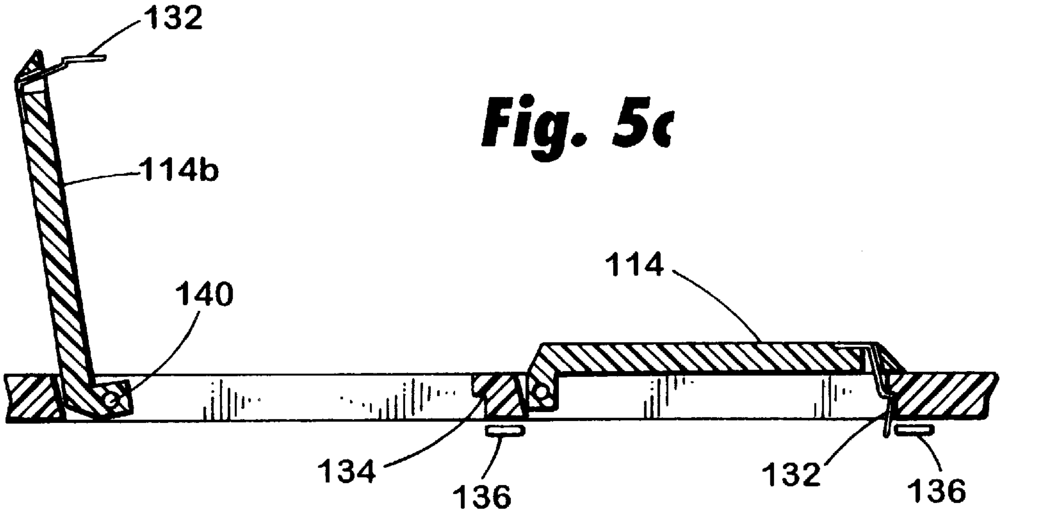
FIG. 5*c* is a close up view of part of 5*b;*
Figure 5B:
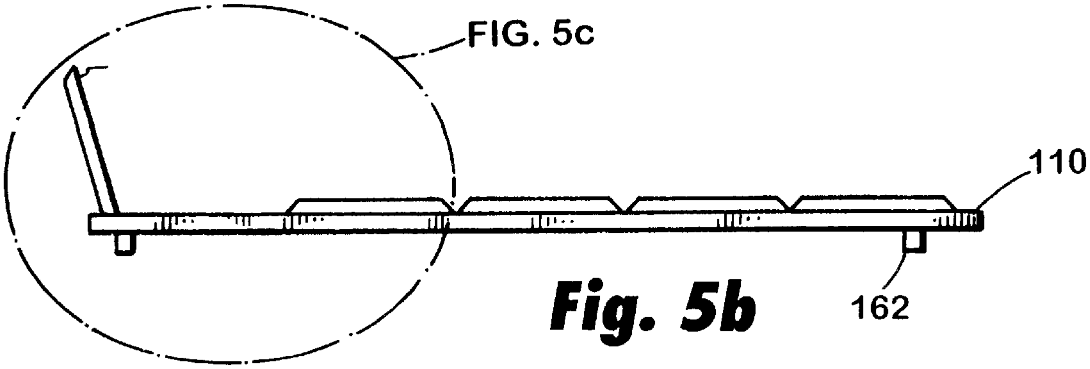
FIG. 5*b* is a side view of the tray frame and lids.

Alignment holes 160 are provided in the drawer ledge 156 to accommodate the alignment pins 162 on the tray frame 110 as depicted in FIGS. 5 and 6. The tray frame 110 and associated alignment pins 162 can be fitted within the alignment holes 160 for properly aligning the container 104 within the drawer 102.

A drawer electrical connection 164 is provided in drawer ledge 156 for connection with the electrical connection 152 in the tray frame 110. Using a latch disengagement process similar to that used to unlatch the tray lid 114, area 166 of drawer ledge 156 contains a locking area so that once the containers 104 are loaded into drawer 102 they are automatically latched. Unlatching a container 104 from drawer 102 requires the computer 106 to energize an unlatching system located at 166 to allow the pharmacist to disengage the container 104 from drawer 102.

Figure 10:
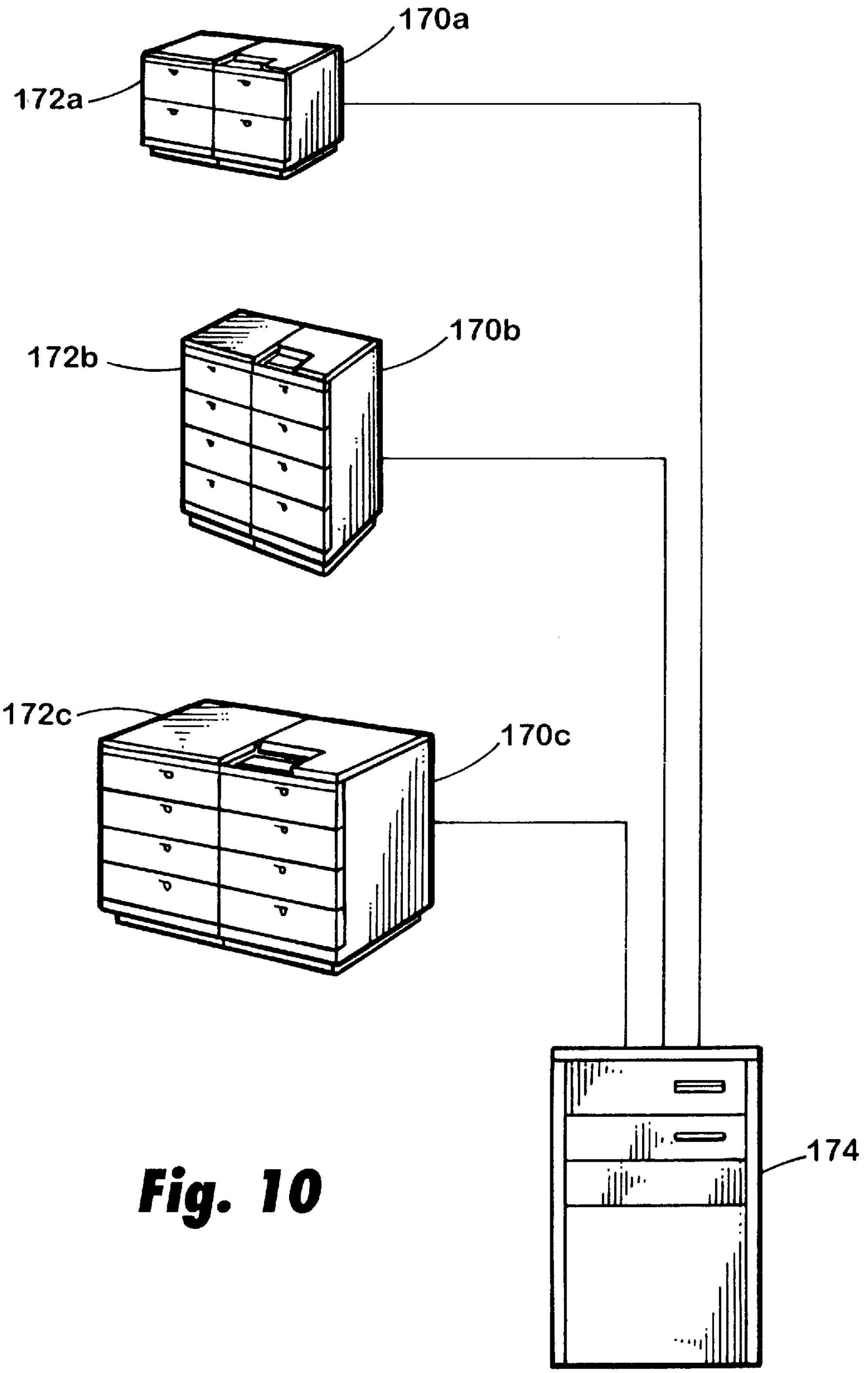
FIG. 10 is a schematic representation of a network of cabinets of different sizes and a primary computer in accordance with the invention.

While the drug dispensing cabinets 100 and containers 104 can be used in a variety of ways to dispense medication and other pharmaceutical items, it is also within the contemplation of the present invention to incorporate one or more drug dispensing cabinets 100 containing containers 104 into systems such as depicted in FIGS. 9 & 10. As shown in FIG. 9, a drug cabinet 100 could be configured as an independent cabinet 170 that incorporates a computer system 106, or as dependent cabinet 172 that at a minimum does not carry a keyboard 106*a* or a display 106*b*, and may be designed to not include any computer. Dependent cabinets 172 are thus in any form required to have communications linkage to an independent cabinet 170. Independent cabinet 170 controls the operation of one or more dependent cabinets 172. The drawer configuration of the independent cabinet 170 does not have to match the drawer configuration of the dependent cabinet 172. This permits a high degree of flexibility for the hospital. One independent cabinet 170 can also control a number of dependent cabinets 172, which do not have to be intimately close to one another. For instance, they can be on different floors of the hospital.

FIG. 10 indicates an alternative arrangement including a series of drug dispensing independent cabinets 170 and dependent cabinets 172 that are electronically networked to a primary computer 174 that can perform such tasks as monitoring the types and quantities of items stored in the drug dispensing cabinets and providing notice when refill of a particular item or items is necessary.

The variety of embodiments of the present invention as described above achieve the recited objects of the claimed invention by providing a secure method of transporting pharmaceutical items, a secure method to store and to provide access to such items, and by providing complete and reportable control over the inventory of pharmaceutical items, from loading to storage to access for patient dispensing. The present invention in any of its embodiments provides a system that is easy to use, space efficient, cost effective, and permits random access to a variety of stored pharmaceutical items.

One intended use of the invention would be in a health care institution, such as a hospital. Hospitals typically have a pharmacy and the system would be administered by a pharmacist with assistants. It is contemplated that a hospital employing the invention would have drug dispensing cabinets 100 disposed at convenient locations throughout the hospital corresponding generally with the practice areas. Both independent cabinets 170 and dependent cabinets 172 could be used as needed, with all units being in electric communication with a primary computer 174 either directly, as in the case of the independent units, or indirectly as in the case of the dependent units.

The primary computer 174 would be programmed to maintain current knowledge of the contents of each compartment in the system. This knowledge would be used by the primary computer to identify when containers 104 needed to be refilled, or replaced with newly filled containers 104. It is contemplated that the primary computer 174 could be programmed to generate and retain a great variety of information depending upon the needs of a particular user. Some of this information might include notices to the pharmacy when replacements are needed, and suggestions as to what pharmaceutical items should be provided as replacements. This latter information might take advantage of the computer's statistical abilities to detect increased usages of certain types of pharmaceuticals and to predict future demand. The system, whether in the primary computer 174 or in a electronic memory device 154 integral to each container 104, can store a great variety of information depending upon the needs of the user. Such information would not only include the type of pharmaceutical item stored in a compartment 112, but its lot number, expiration date, date of loading in the container 104 and similar information.

The dispensing system may include a primary computer and at least one secondary computer wherein the primary computer is adapted to receive and store data representing the pharmaceutical items stored in each compartment of each container, and the secondary computer is adapted to serve as an outside source of control signals. In one embodiment, at least one secondary computer is adapted to send control signals to the drawer mechanism and control signals to the mechanism associated with each lid to cause each mechanism to operate to permit access by a human user to the compartment identified as containing a requested pharmaceutical item. The primary computer may be adapted to record the identity of the compartments in each drawer of the dispensing system which access has been permitted.

It is contemplated that replacement of containers 104 in the system would be conducted by the pharmacist or assistants. Using their own knowledge or the recommendations of the primary computer 174, they would determine the needed contents of the containers 104 to be replaced. These would be placed in the containers 104, which would then be securably closed, and delivered to and placed in the desired drawers 102 of the respective cabinets.

The loading process can be facilitated by using a loading apparatus (not shown) which is similar to the cabinet 100, but having space for only one container 104. A container 104 is placed in the loading apparatus, and the computer associated with the loading cabinet sends the appropriate signals to open the lids permitting serial loading of the container 104 on a compartment-by-compartment basis. As each compartment 112 is filled with an item, input is provided to the control computer identifying the container 104 and desired information about the item. It is contemplated that a barcode wand or keyboard entry can be used to enter desired information, such as drug type, lot number and expiration date, into the loading apparatus computer. That computer can in turn relay the information to a container memory 154 integral with the container 104.

The loading apparatus can be connected directly to the primary computer 174 which can provide a display to the person identifying which type of item should be placed in a particular compartment. The primary computer 174 can also serve as the control computer for the loading apparatus. The loading apparatus, as with all cabinets 100 in the system, can be provided with a requirement that a user input an identification number before being provided access to operate the system. The loading apparatus can be configured such that each lid 114 is closed when a compartment 112 is loaded or instead kept open until all compartments 112 are loaded and the lids 114 then closed only after a verification of correct loading by a pharmacist.

It may desirable in some instances to return to the pharmacy containers 104 that have not been completely emptied. In this instance, it is contemplated that the loading apparatus may be used to open the lids associated with compartments still containing items and, to maintain inventory control, to identify the items removed from the compartment 112 to the primary computer 174.

The preferred embodiment of the present invention operates by virtue of the fact that computers employed in the system have knowledge of the contents of each compartment 112. When a user, such as a nurse, inputs a request to the system via a computer keyboard 106*a*, one or more computers in the system can then identify the location of such an item and send the appropriate control signals to provide access to the compartment 112 containing the item. It can be seen that the system can be programmed to choose among a number of compartments 112 containing the same type of item on the basis of a variety of desired criteria, such as convenient proximity to the user, relative times the items have been in storage, consistent depleting of a particular lot number, or choosing on the basis of the most efficient emptying of containers. On the latter point, for example, the system might choose to provide access to the last item in a container as opposed to the same item in a fully loaded container, so that the former container will be emptied and available for return and refilling. As returns of pharmaceutical items to the pharmacy are never efficient, a single container carrying a mixture of pharmaceutical items will allow for sufficient inventory, for a period of time, in a drug dispensing cabinet in which a number of containers may be nearly empty.

This foregoing description of an embodiment of the invention illustrates the desirability of having the computer or computers used in the system be able to identify the types of items in each compartment. A variety of operations can be used to accomplish this result. One option, previously noted, is to input the data identifying the items in each container 104 into an electronic memory 154 integral with the container 104 itself. In this system, the containers 104 could be loaded without knowledge of their contents on the part of an assistant, and the loading apparatus computer would be able to interrogate the container memory to learn of the contents of each compartment 112. The computer 106 can transfer this information into its own resident memory and be available for polling by the primary computer 174.

Of course, even in this system it can be desirable for the container 104 to have markings visible to a human user. For instance, containers 104 loaded with different items will likely be intended for particular cabinets 100. Visual references, such as numerals, can assist a person delivering and loading the replacement containers 104 to place them in the proper drawers 102.

Use of unique identifiers associated with the containers 104, within the form of visual markings understandable to a person, or machine readable identifiers, can eliminate the need for electronic memory 154 integral with each container 104. In this alternative embodiment, when each container 104 is loaded, the identity of the container 104 and the contents of each of its compartments 112 are stored in a primary computer 174. When the container 104 is placed into a cabinet 100, the unique identifier can be used by the computer 106 associated with that cabinet to identify the container 112 and then interrogate the primary computer 174 as to the contents.

The unique identifier can take any of a variety of forms of machine readable data. It is contemplated that such identifiers could include barcode on the container and barcode readers in the drawer, a radiofrequency identification device integral to the container and a detector associated with the cabinet, or a magnetic stripe on the container and magnetic stripe reader in the drawer.

Unique identifiers used in the system could also use, or include, human readable markings, such as a number, affixed to the container 104 by means such as embossing or silkscreening. Use of such markings would eliminate the need for reading devices in the cabinets 100. For instance, a pharmacist assistant could place a container 104 in a drawer 102 and input to the associated computer via keyboard 106*a* the visually observable number on the container. Alternatively, the computer 106 associated with the drawer 102 might first interrogate the primary computer 174 as to which container 104 is needed in that drawer 102, and then display to the assistant the number of the desired container 104, which could then be identified by the assistant and loaded into the drawer 102. If desired, the assistant can be asked to enter the number of the container 104 just loaded in the drawer for the computer 106 to compare against the requested number for a reliability check. Additionally, upon receiving an indication that a drawer loading sequence is desired, the computer 106 could be programmed to then provide an indication of the first container 112 to be replaced and unlock the drawer 102 holding that container 104. The assistant could remove the container 104 and identify to the computer 106 that the container 104 has been removed. The computer 106 could then identify which container 104 should be inserted. The assistant would select the container 104 and install it in the drawer 102, at which point the computer 106 could read, if available, the electronic memory integral with the container 104 to cross-check that the proper container 104 has been entered. If an error has been made, the computer 106 may identify this to the assistant and also record that an error was made for a potential maintenance check. This loading sequence can be repeated until the cabinet 104 is loaded.

Of course, these drawer-loading operations could also be conducted by the assistant with containers 104 having only identifiers not directly readable by a human, such as radiofrequency identification devices, by providing the assistant with a device capable of translating the identification device into a human readable form for the assistant to then rely upon to identify and handle the container 104 as if it contained understandable markings in the manner previously described.

Containers 104 with unique identifiers can also use integral electronic memories 154 to store certain information such as time of loading into a drawer 102. The electronic memories 154 can also store the identifier associated with the container 104 as a basis for comparison to the identifier entered by a user as identifying that container 104 for reliability purposes. Various reliability algorithms might be provided, such as requiring rekeying of the identifier and, after two errors, requiring input from a different qualified user. Alternatively, two errors might prompt the system to store the cautionary note that the container 104 has a history of being misidentified, prompting a reliability check related to that container 104.

Having now described in detail the methodology of our invention, those in the art will appreciate more than the detailed means described for implementing the invention, and our invention is not meant to be limited merely to these detailed implementations, but to all implementations comprehended by our claims.

What is claimed is:

1. A dispensing apparatus for a dispensing pharmaceutical items, comprising:

at least one container having at least one compartment suitable for retrievably containing at least one pharmaceutical item, wherein each said compartment having associated therewith a lid moveable between a closed position restricting access to said compartment and an open position permitting access to said compartment; and at least one computer operable to restrict the accessibility of each said compartment to authorized users by controlling the movement of each said lid between said closed and opened position.

2. A dispensing apparatus as claimed in claim 1, further comprising an information source associated with each container accessible by said at least one computer.

3. A dispensing apparatus as claimed in claim 2, wherein said information source is adapted to store information identifying each pharmaceutical item contained in each compartment.

4. A dispensing apparatus as claimed in claim 2, wherein said information source comprises electronic memory in communication with said at least one computer.

5. A dispensing apparatus as claimed in claim 4, wherein said electronic memory comprises a distinct electronic memory associated with each container.

6. A dispensing apparatus as claimed in claim 5, wherein said distinct electronic memory comprises a read/write memory device affixed to said container.

7. A dispensing apparatus as claimed in claim 6, wherein said read/write memory device records the time at which the container is loaded with said at least one pharmaceutical item.

8. A dispensing apparatus as claimed in claim 4, wherein each said container has associated therewith a unique identifier and said electronic memory stores data related to the identity of a pharmaceutical item contained in each said container by reference to the unique identifier associated with the container containing the pharmaceutical item.

9. A dispensing apparatus as claimed in claim 1, wherein said at least one computer is operable to receive input related to a request for a specific pharmaceutical item, identify a compartment containing said specific pharmaceutical item, and send appropriate control signals to cause an authorized user to have access to said compartment containing said specific pharmaceutical item.

10. A dispensing apparatus as claimed in claim 9 further comprising a mechanism securing each said lid in a closed position and responsive to control signals from said at least one computer to permit each said lid to be movable to an open position.

11. A dispensing apparatus as claimed in claim 10, wherein said mechanism comprises electromechanical means for releasably securing said associated lid in a first configuration of said electromechanical means and wherein said control signals from said at least one computer comprises electrical signals suitable to energize said electromechanical means to change to a second configuration permitting movement of said associated lid to an opened position.

12. A dispensing apparatus as claimed in claim 9, further comprising an information source accessible by said at least one computer, said information source being adapted to store information identifying the specific pharmaceutical item contained in each respective compartment.

13. A dispensing apparatus as claimed in claim 12, wherein said at least one computer identifies the compartment containing said specific pharmaceutical item by reference to said information source.

14. A dispensing apparatus as claimed in claim 13, wherein said input related to a request for a specific pharmaceutical item comprises a keyboard entry.

15. A dispensing apparatus as claimed in claim 14, wherein said mechanism comprises electromechanical means for releasably securing said associated lid in a first configuration of said electromechanical means, and wherein said control signals from at least one computer comprising electrical signals suitable to energize said electromechanical means to change to a second configuration permitting movement of said associated lid to an open position.

16. A dispensing apparatus as claimed in claim 9, wherein said input related to a request for a specific pharmaceutical item comprises a keyboard entry.

17. The dispensing apparatus as claimed in claim 9, wherein said at least one computer records the identity of each compartment to which a user has been permitted access.

18. The dispensing apparatus as claimed in claim 17, wherein said at least one computer does not permit access to the same compartment more than once without receiving an indication that said compartment has been refilled with a pharmaceutical item.

19. A dispensing apparatus as claimed in claim 9, wherein no more than one lid of any container is permitted to open at any one time.

20. A container for pharmaceutical items, comprising:

a tray having at least one compartment adapted to retrievably contain at least one pharmaceutical item;

each said compartment having associated therewith a lid movable between a closed position restricting access to the associated compartment and an open position permitting access to the associated compartment; and each said lid having associated therewith a mechanism responsive to control signals from a source outside said container to permit movements of each said lid between said closed and open positions such that access to said compartment is restricted to authorized users.

21. A container as claimed in claim 20, wherein said source outside the container comprises at least one computer.

22. A container as claimed in claim 20, wherein each said compartment is configured to permit ready access in a region near the upper part of the compartment to pharmaceutical items of varying shapes which can be contained in said compartment.

23. A container as claimed in claim 22, wherein each compartment is further configured to retrievably contain vials in a vertical orientation, ampules in a horizontal orientation, and dosage envelopes in a vertical orientation.

24. A container as claimed in claim 20, wherein each said compartment is adapted to contain said at least one pharmaceutical item in a position within said each compartment such that at least a portion of said pharmaceutical item is positioned in the upper portion of said compartment.

25. A container as claimed in claim 20, wherein said tray has at least two compartments with aligned notches, said notches being successively longer in each successive compartment and together configured so as to hold an elongated object at an angle within said container.

26. A container as claimed in claim 25, wherein said elongated object is retrievable by a human user only when the lid associated with the compartment having the shortest of the aligned notches is open.

27. A container as claimed in claim 20, wherein each said lid is mounted in pivotable relationship with said tray.

28. A container as claimed in claim 27, which further comprises a torsion spring associated with each said lid to bias each said lid in an open position.

29. A container as claimed in claim 20, wherein each said lid is biased in a closed position.

30. A container as claimed in claim 20, wherein each said lid is secured in the closed position.

31. A container as claimed in claim 30, wherein said mechanism serves to secure the lid when said lid is in the closed position.

32. A container as claimed in claim 20, wherein said mechanism comprises a latch and a latch release associated with each said lid retaining said lid in a closed position, said latch being releasable by said latch release to permit said lid to be movable to an open position.

33. A container as claimed in claim 32, wherein said latch release includes a release element movable in response to a control signal from said outside source to contact and move said latch to a position which permits said lid to be movable to an open position.

34. A container as claimed in claim 33, wherein said release element comprises a solenoid-driven plunger.

35. A container as claimed in claim 33, wherein said release element comprises a memory metal.

36. A container as claimed in claim 33, wherein at least a portion of said latch release is located outside the container.

37. A container as claimed in claim 20, wherein said mechanism includes means for retaining each said lid in a closed position.

38. A container as claimed in claim 37, wherein said means comprises an electromechanical means.

39. A container as claimed in claim 38, wherein said electromechanical means comprises a latch and a latch release comprising a solenoid-driven plunger.

40. A container as claimed in claim 20 wherein said container has associated therewith a unique identifier.

41. A container as claimed in claim 40, wherein said unique identifier is readable by electromagnetic means.

42. A container as claimed in claim 41, wherein said unique identifier is readable only by electronic contact.

43. A container as claimed in claim 42, wherein said unique identifier comprises an electronic memory affixed to said container and operable to serve as a unique identifier of the container to said at least one computer.

44. A container as claimed in claim 41, wherein said unique identifier comprises magnetically readable material affixed to said container.

45. A container as claimed in claim 40, wherein said unique identifier comprises a radio frequency device affixed to said container.

46. A container as claimed in claim 40, wherein said unique identifier comprises a barcode affixed to said container.

47. A container as claimed in claim 40, wherein said unique identifier comprises a visible mark affixed to said container.

48. A container as claimed in claim 47, wherein said unique identifier is removable from said container.

49. A container as claimed in claim 47, wherein said unique identifier is replaceable.

50. A container as claimed in claim 40, wherein said unique identifier is removable from said container.

51. A container as claimed in claim 40, wherein said unique identifier is readily replaceable.

52. A dispensing system for dispensing pharmaceutical items, comprising:

at least one support structure supporting at least one drawer, each said drawer being adapted to receive at least one container as claimed in claim 20, and being movable with respect to said support structure between an open position permitting access to a given compartment of a given container and a closed position restricting access to all containers in each said drawer; and at least one computer operable to restrict access to each compartment in each container to authorized users.

53. A dispensing system as claimed in claim 52, further comprising a drawer mechanism associated with each drawer suitable for releasably securing each said drawer in a closed position.

54. A dispensing system as claimed in claim 53, wherein each said drawer is spring-biased to move to an open position.

55. A dispensing system as claimed in claim 53, wherein said drawer mechanism includes a latch which retains said drawer in a closed position and is releasable to permit said drawer to move to an open position.

56. A dispensing system as claimed in claim 55, wherein said drawer mechanism further includes a electromechanical member which moves in response to a control signal from said at least one computer to contact and move said latch to a position which releases said drawer to move to an open position.

57. A dispensing system as claimed in claim 56, wherein said electromechanical member comprises a solenoid-driven plunger.

58. A dispensing apparatus as claimed in claim 56, wherein said electromechanical member is a portion of memory metal.

59. A dispensing system as claimed in claim 53, further comprising an electromechanical means for retaining each said drawer in a closed position.

60. A dispensing system as claimed in claim 59, wherein said electromechanical means is an electromagnet.

61. A dispensing system as claimed in claim 59, wherein said electromechanical means is a solenoid.

62. A dispensing system as claim in claim 52, wherein each of said drawers is adapted to receive at least one container and wherein each said compartment is configured to permit ready access in a region near the upper part of the compartment to pharmaceutical items of varying shapes which can be contained in said compartment.

63. A dispensing system as claimed in claim 62, wherein each compartment is further configured to retrievably contain vials in a vertical orientation, ampules in a horizontal orientation, and dosage envelopes in a vertical orientation.

64. A dispensing system as claimed in claim 52, wherein each of said drawers is adapted to receive at least one container and wherein each said compartment is adapted to contain said at least one pharmaceutical item in a position within said each compartment such that at least a portion of said pharmaceutical item is positioned in the upper portion of said compartment.

65. A dispensing system as claimed in claim 52, wherein each of said drawers is adapted to receive at least one container and wherein said tray has at least two compartments with aligned notches, said notches being successively longer in each successive compartment and together configured so as to hold an elongated object at an angle within said container.

66. A dispensing system as claimed in claim 65, wherein said elongated object is retrievable by a human user only when the lid associated with the compartment having the shortest of the aligned notches is open.

67. A dispensing system as claimed in claim 52, wherein each of said drawers is adapted to receive at least one container and wherein each said lid is mounted in pivotable relationship with said tray.

68. A dispensing system as claimed in claim 67 which further comprises a torsion spring associated with each said lid to bias each said lid in an open position.

69. A dispensing system as claimed in claim 52, wherein each of said drawers is adapted to receive at least one container and wherein each said lid is biased in a closed position.

70. A dispensing system as claimed in claim 52, wherein each of said drawers is adapted to receive at least one container and wherein each said lid is secured in the closed position.

71. A dispensing system as claimed in claim 70, wherein said mechanism serves to secure the lid when said lid is in the closed position.

72. A dispensing system as claimed in claim 52, wherein each of said drawers is adapted to receive at least one container and wherein said mechanism comprises a latch and a latch release associated with each said lid retaining said lid in a closed position, said latch being releasable by said latch release to permit said lid to be movable to an open position.

73. A dispensing system as claimed in claim 70, wherein said latch release includes a release element movable in response to a control signal from said outside source to contact and move said latch to a position which permits said lid to be movable to an open position.

74. A dispensing system as claimed in claim 73, wherein said release element comprises a solenoid-driven plunger.

75. A dispensing system as claimed in claim 73, wherein said release element comprises a memory metal.

76. A dispensing system as claimed in claim 73, wherein at least a portion of said latch release is located outside the container.

77. A dispensing system as claimed in claim 52, wherein each of said drawers is adapted to receive at least one container and wherein said mechanism includes means for retaining each said lid in a closed position.

78. A dispensing system as claimed in claim 77, wherein said means comprises an electromechanical means.

79. A dispensing system as claimed in claim 78, wherein said electromechanical means comprises a latch and a latch release comprising a solenoid-driven plunger.

80. A dispensing system as claimed in claim 52, further comprising an information source accessible by said at least one computer.

81. A dispensing system as claimed in claim 80, wherein said information source is adapted to store information related to the identity of said at least one pharmaceutical item contained in each said compartment.

82. The dispensing system of claim 52, wherein said computer has access to data identifying the pharmaceutical items stored in each said compartment.

83. The dispensing system of claim 52, wherein said at least one computer comprises a primary computer and at least one secondary computer, wherein said primary computer is adapted to receive and store data representing the pharmaceutical items stored in each compartment of each said container, and each secondary computer is adapted to serve as said outside source of control signals.

84. The dispensing system of claim 83, wherein each secondary computer is associated with at least one support structure.

85. The dispensing system of claim 84, wherein each secondary computer is adapted to receive input indicating a request for a pharmaceutical item.

86. The dispensing system of claim 85, further comprising an information source to which each secondary computer is cooperatively coupled to identify one or more compartments in which requested pharmaceutical items are located.

87. The dispensing system of claim 86, in which said primary computer serves as said information source.

88. The dispensing system of claim 83, further comprising a drawer mechanism associated with each drawer suitable for releasably securing each said drawer in a closed position.

89. The dispensing system of claim 88, wherein said at least one secondary computer is adapted to send control signals to said drawer mechanism and control signals to said mechanism associated with each said lid to cause each said mechanism to operate to permit access by a human user to the compartment identified as containing said requested pharmaceutical item.

90. The dispensing system of claim 89, wherein said primary computer is adapted to record the identity of the compartments in each drawer of the dispensing system to which access has been permitted.

91. A method for dispensing pharmaceutical items, comprising:

loading at least one pharmaceutical item into at least one compartment of at least one container each compartment having associated therewith a lid movable between a closed position restricting access to the associated compartment and an open position permitting access to the associated compartment;

restricting the access to the compartment to an authorized user by providing a mechanism associated with each lid responsive to control signals from one or more computers to permit movement of each lid between the closed and open positions;

storing in an information source the identity of each pharmaceutical item loaded into each compartment;

inserting each container into a drawer of a dispensing apparatus;

inputting data into one or more of the computers to identify a specific pharmaceutical item the authorized user wishes to retrieve, one or more of the computers operable to use the information source to identify a compartment which contains the specific pharmaceutical item the authorized user wishes to retrieve and to cause the drawer and lid associated with the identified compartment to open and permit access by the authorized user to the specific pharmaceutical item within the compartment.

92. The method as claimed in claim 91, further comprising the steps of updating the information source to indicate that a human user has accessed the identified compartment and to assume that the identified compartment no longer contains the specific pharmaceutical item.

93. The method as claimed in 92, further comprising the step of providing an indication to a user that all compartments of a particular container have been accessed.

94. The method as claimed in claim 93, further comprising the step of identifying to a user the specific pharmaceutical items to be loaded in a container.

95. The method as claimed in claim 94, further comprising the step of maintaining each compartment in a secured configuration except when said at least one computer causes an identified compartment to open to permit access.

96. A dispensing system as claimed in claims 62–78, 86, or 87, wherein each container is properly aligned within a drawer by having alignment pins on each container which correspond to alignment holes on each drawer.

* * * * *